(12) United States Patent
Auffret et al.

(10) Patent No.: US 7,107,070 B2
(45) Date of Patent: Sep. 12, 2006

(54) WIRELESS VIDEO CAMERA

(75) Inventors: Eric Auffret, Noyal sur Vilaine (FR); Philippe Morel, Rennes (FR); Jean-Paul Plessix, Chartres de Bretagne (FR)

(73) Assignee: Thomson Licensing, Boulogne-Billancourt (FR)

( * ) Notice: Subject to any disclaimer, the term of this patent is extended or adjusted under 35 U.S.C. 154(b) by 297 days.

(21) Appl. No.: 10/245,049

(22) Filed: Sep. 17, 2002

(65) Prior Publication Data

US 2003/0052994 A1  Mar. 20, 2003

(30) Foreign Application Priority Data

Sep. 17, 2001 (FR) .................................. 01 12120

(51) Int. Cl.
*H04M 1/00* (2006.01)
*H04B 1/38* (2006.01)

(52) U.S. Cl. ................... 455/556.1; 455/566; 455/557; 455/67.11; 455/344; 348/376; 348/192; 348/207.99; 358/405; 358/435

(58) Field of Classification Search ............. 455/556.1, 455/5.57, 566, 66.1, 67.11, 67.13, 67.7, 226.1, 455/344; 348/376, 192, 207.99, 207.1, 211.2, 348/211.1, 330.01, 330.04; 358/405, 435, 358/438, 443; 375/221, 259
See application file for complete search history.

(56) References Cited

U.S. PATENT DOCUMENTS

| | | | | |
|---|---|---|---|---|
| 4,097,893 A | * | 6/1978 | Camras | ...................... 348/158 |
| 5,640,684 A | | 6/1997 | Konosu et al. | ............ 455/67.7 |
| 5,844,601 A | * | 12/1998 | McPheely et al. | .......... 348/143 |
| 5,917,542 A | * | 6/1999 | Moghadam et al. | ... 348/231.99 |
| 6,154,489 A | * | 11/2000 | Kleider et al. | .............. 375/221 |
| 6,476,869 B1 | * | 11/2002 | Sekine et al. | ............... 348/335 |
| 6,535,243 B1 | * | 3/2003 | Tullis | ...................... 348/207.1 |
| 2002/0147982 A1 | * | 10/2002 | Naidoo et al. | .............. 725/105 |

* cited by examiner

*Primary Examiner*—Edan Orgad
(74) *Attorney, Agent, or Firm*—Joseph J. Laks; Robert B. Levy; Jorge Tony Villabon

(57) ABSTRACT

The invention relates to a video camera system comprising a mobile video camera 1 and a base station 2. The camera 1 comprises means of acquiring images and means of radio transmission of the acquired images. The base station 2 comprises means of radio reception for receiving the acquired images. The system comprises evaluation means AGC, MER, BER and 500 for evaluating the quality of the transmission between the camera 1 and the base station 2, and display means 506 to 509 for displaying information QR relating to the quality of transmission.

18 Claims, 4 Drawing Sheets

WIRELESS VIDEO CAMERA

BACKGROUND OF THE INVENTION

1. Field of the Invention

The invention relates to a wireless video camera, and more respectively to cameras and systems of cameras intended to supply live images.

2. Related Art

Professional video cameras serve to film an image sequence so as to replay it generally on a television. Some video cameras are intended to supply live images. The expression "supply live images" should be understood to mean broadcast images to the antenna while the camera is capturing the images. This type of video camera is generally intended for multi-camera professional use.

To be able to supply live images, the most prevalent camera system is a camera linked to a camera control component by way of a triaxial cable better known as a triax. The camera control component allows remote monitoring of most of the parameters of the camera so as in particular to be able to inter-calibrate the cameras during picture shots. The use of a cable yields mobile cameras whose movements are limited by the cable. Operators sometimes have to ensure passage of the cable during displacements of the camera.

It is moreover known to resort to wireless systems in order to circumvent the limitations engendered by the cable. Analog transmission systems are known. A drawback of analog systems is the use of wide bandwidths at high frequencies which necessitate the pointing of the reception antenna. In order to tailor or control the parameters of the cameras, it is known to resort to a return path of much higher frequency and a much narrower spectrum. Should there be an obstacle in the transmission path or should the reception antenna be pointed wrongly, noise appears on the image received by the control component. When the producer reckons that the noise is too great he does not select the camera.

Wireless video cameras using digital transmission are currently offered by camera manufacturers. Various transmission systems are possible. However, all digital transmission systems comprise the use of an error correcting code in order to circumvent the noise-related degradations of the transmission channel. The noise of the channel depends on numerous parameters relating to the environment in which the camera is deployed and relating to the distance between the camera and the antenna of a base station. Worst situation operating conditions are defined so as to have an approximation of the corresponding maximum noise in order to determine which corrector code should be used. Whatever the estimation of the maximum noise of the channel and the corrector code used, there is always a moment at which the camera is in a critical operating situation and when the number of errors to be corrected exceeds the permitted error correction threshold. When the error correction ratio is exceeded, it results in an abrupt loss of image which cannot be anticipated by the producer. Such a problem is especially detrimental to the use of such cameras for supply live images.

SUMMARY OF THE INVENTION

The inventive arrangement anticipates image dropouts in wireless video camera systems equipped with a digital transmission device. According to the invention, information relating to the quality of transmission is supplied to warn at least one operator so as to prevent use of the camera in a critical transmission zone The inventive video camera system comprises a mobile video camera and a base station. The camera. comprises means of acquiring images and means of radio transmission of the images. The base station comprises means of radio reception for receiving the images. The system comprises evaluation means for continuously evaluating the quality of the image transmission between the camera and the base station, and display means for displaying information relating to the quality of transmission.

Preferably, the evaluation means are placed in the base station and the evaluation of the quality of transmission is achieved on receipt of the images.

According to various alternative embodiments, the display means are placed in the base station and/or in the camera.

The invention pertains equally to a camera, a base station or the system comprising at least one base station and at least one camera.

BRIEF DESCRIPTION OF THE DRAWINGS

The invention will be better understood and other features and advantages will become apparent on reading the description which follows, the description making reference to the appended drawings in which.

DESCRIPTION OF PREFERRED EMBODIMENTS

Figure 1:
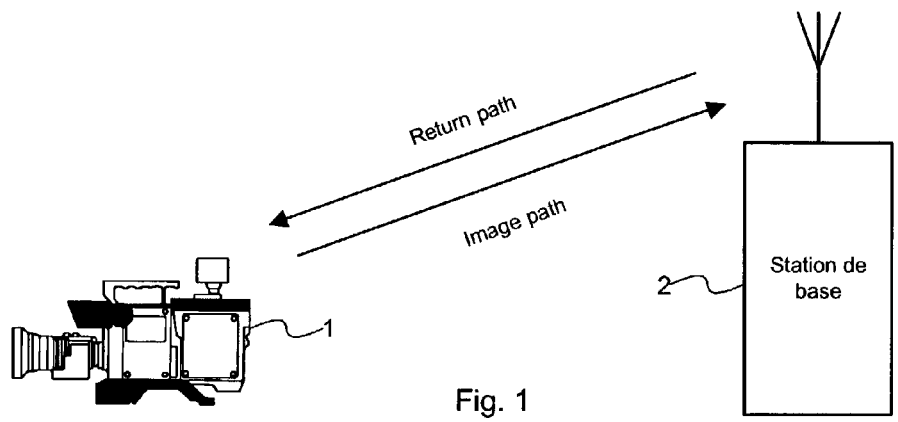
FIG. 1 diagrammatically represents a wireless camera system.

FIG. 1 represents a wireless camera system. A camera 1 carries out an image acquisition and transmits them by radio frequency (RF) transmission to a base station 2 on an "image path". The base station comprises display means for displaying the camera images and transmission means for transmitting commands to the camera by an RF "return path". The base station also has a video output for sending the images from the camera to a video mixing control component. In a preferred example, the radio frequency transmission of the image path is carried out with the aid of a digital modulation of a known type coupled with the camera.

Figure 2:
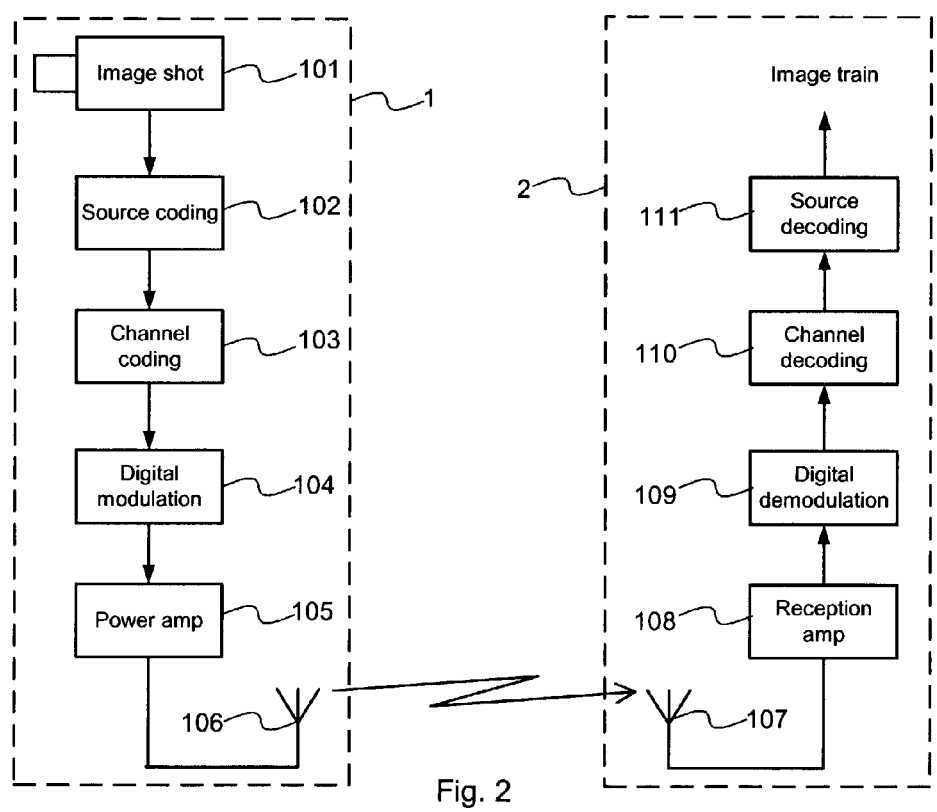
FIG. 2 represents a block diagram of the image path of a wireless camera system.

The manner of operation of the image path is explained in conjunction with FIG. 2. The camera 1 comprises image acquisition means 101 of a known type which supply a train of images for example on a digital bus. A source coding circuit 102 receives the image train and carries out a data compression so as to reduce the amount of information to be transmitted. The data compression can be achieved according to various techniques using the spatial and temporal redundancies of the images. Use is made for example of the compression techniques known by the acronyms MPEG, MJPEG, DV with a low compression ratio which engenders very little loss of information. The source coding circuit 102 outputs a digital data train to be transmitted. A channel coding circuit 103 receives the digital data train to be transmitted and supplies a modulating signal. The channel coding circuit 103 prepares the data train for modulation and for transmission by appending communication protocol data and redundancy data with a view to transmission error correction. A modulation circuit 104 performs a digital modulation and the frequency transpositions required to supply a signal to be transmitted. The modulation is preferably a multicarrier modulation where each carrier is phase- and amplitude-modulated. The signal to be transmitted is then amplified by a power amplifier 105 which feeds an antenna 106 so as to transmit a signal destined for the base station 2.

The base station 2 has an antenna 107 furnished with filtering means for selecting the transmission band corresponding to signals transmitted by the camera 1. A reception amplifier 108 amplifies the signal received by the antenna. The reception amplifier 108 is furnished with means of automatic gain adjustment so as to supply a demodulation circuit 109 with a signal of medium power at a predetermined level. The demodulation circuit 109 performs the demodulation of the signal and supplies a binary train to a channel decoding circuit 110. The channel decoding circuit performs a correction of any errors present in the binary train and extracts the useful data which it supplies to a source decoding circuit 111. The source decoding circuit decompresses the useful data and supplies a digital train of video images. The base station 2 comprises other means (not represented) for displaying the images received and for transmitting them to other elements of a video control component.

In the image path described with the aid of FIG. 2, the evaluation of the quality of transmission can be achieved with regard to several parameters. A first parameter is the level of the signal received. A second parameter relates to the uncertainties in symbol demodulation. A third parameter is the number of errors corrected with the aid of the error correcting code. Preferably, these three parameters are used simultaneously to anticipate any risk of failure of transmission. The manner in which the various parameters are recovered and the manner in which they are used will now be explained.

Figure 3:
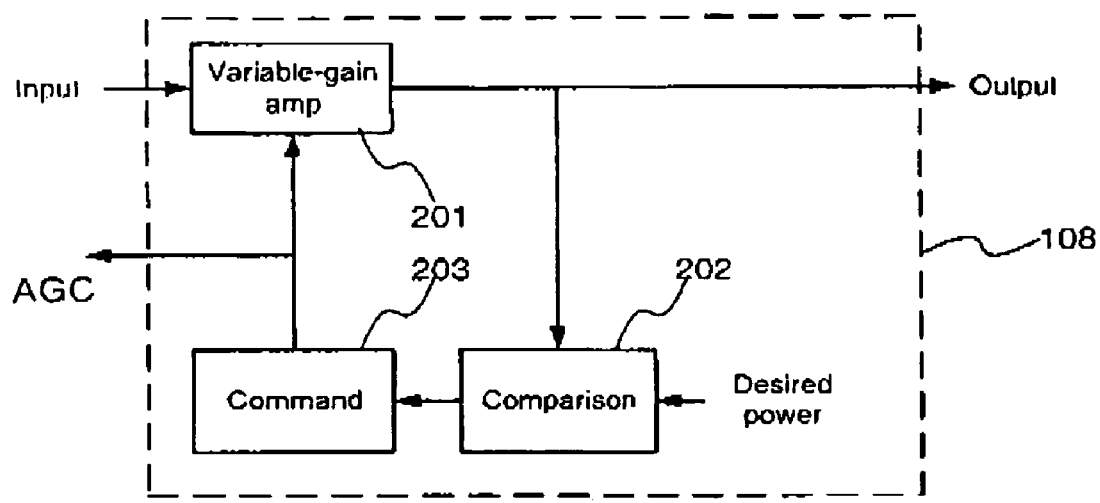
FIG. 3 represents an amplifier used in the invention.

FIG. 3 details the reception amplifier 108. A variable-gain amplification circuit 201 carries out the amplification of the signal between the input and the output, an AGC gain preset determining the amplification factor between the input and the output. A comparison circuit 202 performs a measurement of the average power of the signal at the output of the amplification circuit 201 and compares it with a desired signal power. The result of the comparison is supplied to a control circuit which determines the AGC gain preset to be supplied to the amplification circuit. Such a reception amplifier 108 is known to the person skilled in the art. To evaluate the level of the signal received, it is sufficient to recover the AGC gain preset which is representative of the level of the signal received.

Figure 4:
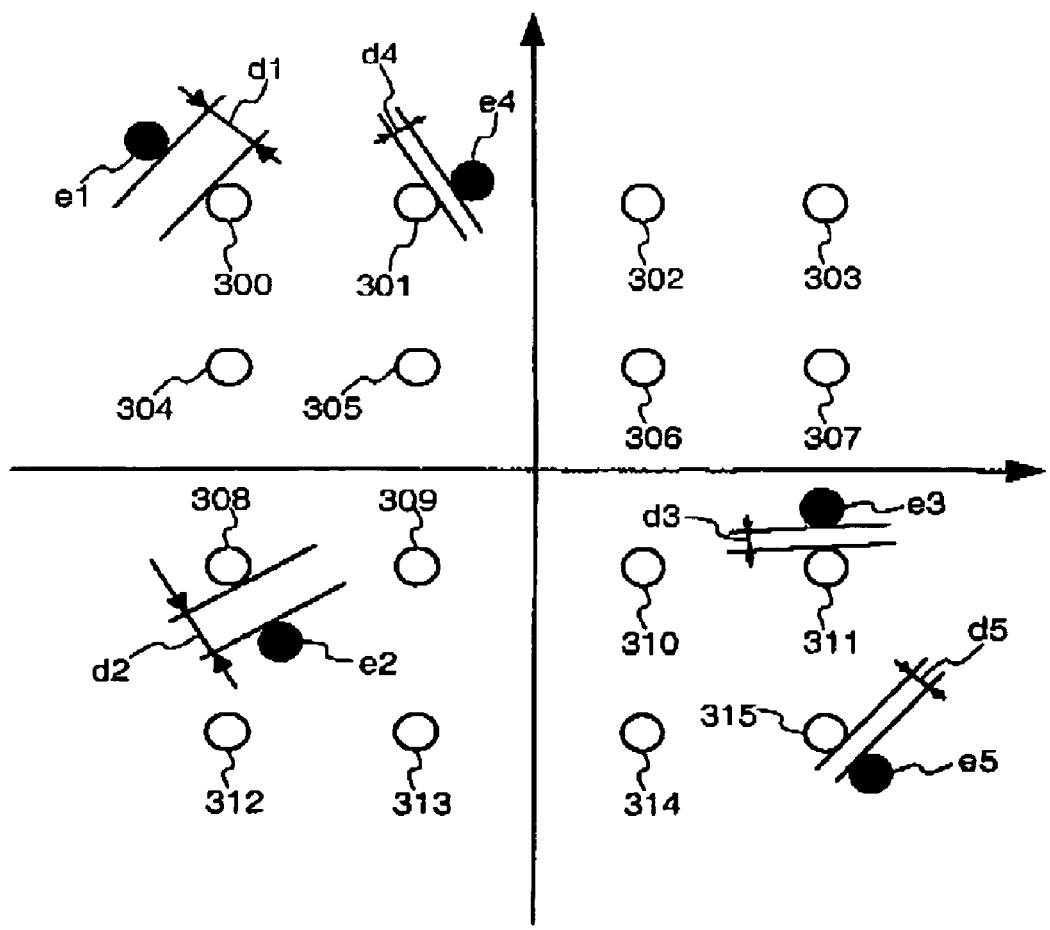
FIG. 4 represents examples of symbol discrepancy in a digital modulation of QAM 16 type.

FIG. 4 explains the symbol discrepancy problems in the demodulation circuit 109. In FIG. 4, the modulation represented is of QAM 16 type, that is to say a phase and amplitude modulation with the aid of 16 symbols homogeneously distributed. Other types of digital modulations are possible and the remarks which follow are also applicable thereto. The white symbols 300 to 315 represent the theoretical symbols or as modulated symbols. The black symbols e1 to e5 correspond to five symbols sampled successively on reception. The demodulation circuit 109 determines that the symbol received is the closest theoretical symbol thus the symbol e1 corresponds to the symbol 300, e2 to 308, e3 to 311, e4 to 301 and e5 to 315.

A modulation error ratio MER corresponds to the distance between the symbol received and the theoretical symbol. The modulation error ratio is due to several factors such as thermal noise, inter-symbol interference, echoes and spurious surrounding sources known as jammers. The distances d1 to d5 are indicated for the respective symbols received e1 to e5. A definition of the modulation error ratio MER is given in the ETSI/ETR 290 standard relating to DVB-T terrestrial digital TV transmissions. The person skilled in the art will take care to choose a demodulation circuit 109 which supplies in parallel with the decoding of the symbols the measurement of the symbol before decoding. A dedicated circuit can then perform the calculation for each symbol received of the modulation error. An average of the modulation errors then constitutes the modulation error ratio MER.

Figure 5:
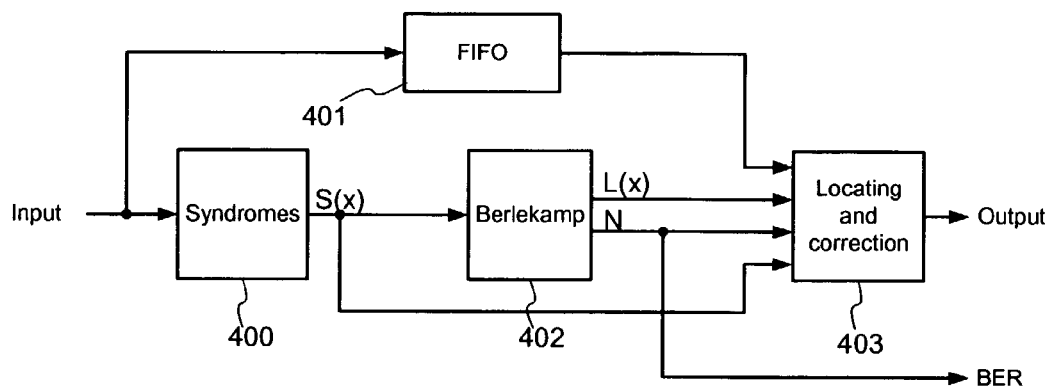
FIG. 5 represents an error correcting circuit.

FIG. 5 represents an error correcting circuit which uses the Reed-Solomon code together with the Berlekamp algorithm. Such a circuit is used in the channel decoding circuit according to one of the known techniques. The data to be decoded arrive simultaneously in a circuit for calculating syndromes 400 and in a buffer memory 401 for example of FIFO (First In First Out) type. When a complete coded word (for example 256 bytes) is received, a polynomial of syndromes S(x) is supplied to the output of the syndrome calculation circuit 400. A calculation circuit 402 processes the syndrome polynomial according to the Berlekamp algorithm and supplies a polynomial L(x) representative of the errors as well as the number of errors N present in the coded word. An error locating and correcting circuit 403 receives the polynomial L(x), the polynomial of syndromes, the number of errors N and the coded word delayed by the buffer memory 401 and performs the necessary corrections. For further details on this decoder, the person skilled in the art may refer to the state of the art.

For the invention, the number of errors is recovered and corresponds to a binary error ratio BER. If the person skilled in the art chooses an error correcting method which does not allow the number of errors to be recovered directly (for example a Viterbi code), it is possible to recode the decoded word and to count the differences between the original coded word and the recoded word, this type of operation being carried out by certain decoding circuits on the market. If two correction circuits are cascaded with interleaving, the error ratio can be calculated for a data packet corresponding to the size of interleaved data by adding up the number of errors corrected by the two correction circuits for the whole of the data packet.

Figure 6:
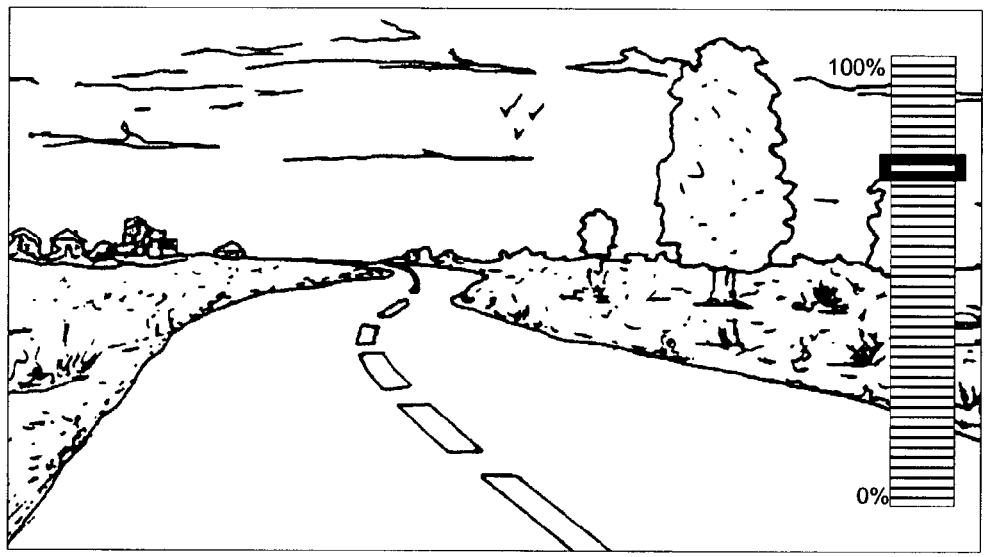
FIG. 6 represents an example of displaying quality of transmission on a monitoring screen.

On the basis of the three parameters AGC, MER and BER, a reception quality ratio QR is calculated and displayed. Display can be achieved either on the camera, or on the base station, or on the camera and the base station, what is important is that it be visible for someone at a given moment. Several types of display are possible. FIG. 6 shows an example of displaying the reception quality ratio QR which represents the quality of transmission on a monitoring screen or in the viewfinder of the camera. An LED display situated near a monitoring screen or the visor may also be suitable. It is also possible to display the quality of transmission with the aid of a display which changes colour as a function of the reception quality ratio QR.

The calculation of the reception quality ratio QR can be achieved according to various methods, one possibility is calculated according to the following formula:

$$QR = \left(1 - a\frac{AGC}{AGCM}\right)\left(1 - b\frac{|MER|}{MERM}\right)\left(1 - c\frac{BER}{BERM}\right)$$

for which AGCM corresponds to the maximum permissible gain preset, |MER| corresponds to a sliding average over one millisecond of the modulation error ratio MER, MERM corresponds to a maximum permissible modulation error ratio, BERM corresponds to a maximum permissible binary error ratio, and a, b and c are weighting coefficients. The coefficients a, b and c are representative of the importance of the parameter with which they are associated and lie between 0 and 1. By way of example, the coefficients a, b and c are respectively equal to ½, ½ and 9/10. Other coefficients and other formulae may be used. It is in particular possible to calculate a barycentre of the three coefficients for example equal to QR=a*AGC/AGCM+b*|MER|/MERM+c*BER/BERM.

The calculation of the reception quality ratio QR can be achieved either with the aid of a dedicated calculation circuit, or with the aid of a microprocessor present in the base station for other tasks. A dedicated circuit allows faster updating of the reception quality ratio QR, but the displacements of a camera or the changes of environment are rather more slow and allow slow updating (for example every 0.1 s).

Figure 7:
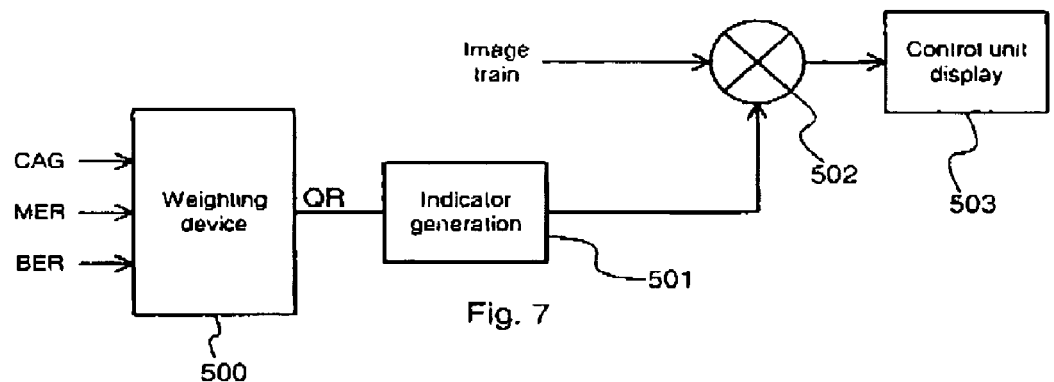
FIG. 7 represents an example of a circuit for displaying the quality of transmission.

FIG. 7 shows a first carrying out of the displaying of the reception quality ratio QR. A weighting device 500 receives the AGC gain preset, the modulation error ratio MER and the binary error ratio BER, and supplies the reception quality ratio QR calculated as indicated previously. An indicator generation circuit 501 transforms the ratio information into a video image which corresponds for example to the graduated bar shown in FIG. 6 on a black background. A video mixer 502 will carry out the inlaying of the graduated bar into each image of the video train from the camera. A display device 503, for example a control component monitor, performs the display of the image with the inlaying of the indicator so that a technician of the control component can realize that the quality of transmission of the signal from the camera is decreasing in a critical manner, making it possible to react accordingly before the camera signal disengages with the antenna (107).

Figure 8:
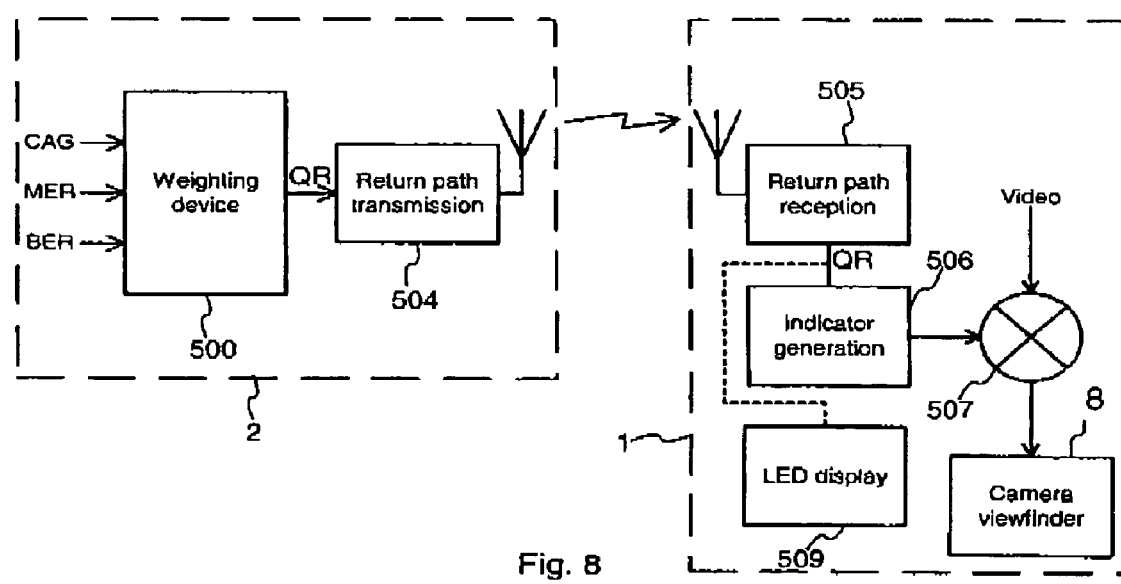
FIG. 8 represents another example of a circuit for displaying quality of transmission.

FIG. 8 shows an alternative display. The weighting circuit 500 supplies the reception quality ratio QR to the return path transmission circuit 504. The return path transmission circuit 504 is commonly used to send parameters or commands to the camera from the base station. In the case of a wireless camera, this transmission is performed over the airwaves on a different carrier from that used by the image having a much smaller data rate which allows a much safer transmission than for the image.

A return path reception circuit 505 placed in the camera 1 receives all the parameters and information which originate from the base station 2 and sends them to the various components of the camera 1. The reception quality ratio QR is sent to an indicator generation circuit 505 which transforms the reception quality ratio QR into a video image. A video mixer 506 carries out the inlaying of the video image representative of the reception quality ratio QR into each image of the video train filmed by the camera 1. A camera viewfinder 8 performs the displaying of the image with the inlaying of the indicator so that the cameraman can realize that the signal from the camera is decreasing in a critical manner and modifies its displacements accordingly so as to avoid disengaging with the antenna.

As far as the simultaneous displaying of the parameter on the image is concerned, as shown in FIGS. 7 and 8, it is possible that the producer or the cameraman may wish not to see the indicator of reception quality ratio QR since the latter masks an important detail of the image. The person skilled in the art can provide a switching device which selects the image alone or the image with the indicator. The person skilled in the art can also provide an autoswitching which displays the reception quality ratio indicator QR as soon as the latter goes below a defined threshold.

In another alternative, a display with light-emitting diodes 509, placed near the screen of the viewfinder of the camera, enables the cameraman to see the transmission ratio. The light-emitting diodes may moreover take a first colour (for example green) when the reception quality ratio QR is high and a second colour (for example red) when the ratio is low, such a change of colour being intended to attract the attention of the cameraman to the LED display 509.

In the preferred example, the three parameters AGC, MER, BER are used. The person skilled in the art can make do with using just one of these parameters. However, the use of the three parameters allows better evaluation since a transmission may be critical whereas two parameters are displaying an average ratio which is not at all alarming.

What is claimed is:

1. A video camera system comprising:
  a mobile video camera, comprising:
    means of acquiring images, and
    means of radio transmission of the acquired images;
  a base station comprising:
    means of radio reception for receiving the acquired images; and
    decoding means for decoding the images and for using redundant image information to correct errors;
  evaluation means for evaluating the quality of image transmission between the camera and the base station, wherein the evaluation means measures a gain required for correct reception of the images a number of errors corrected by the decoding means and a modulation error ratio corresponding to an average of discrepancies between symbols received and transmission symbols, to determine a quality of transmission; and
  display means for displaying information relating to the quality of transmission.

2. The system as claimed in claim 1, the camera comprising image coding means introducing redundant information for error correction.

3. The system as claimed in claim 1, wherein the image transmission is achieved by using a constellation modulation.

4. The system as claimed in claim 1, wherein the evaluation means are placed in the base station and wherein the evaluation of the quality of transmission is achieved on receipt of the images.

5. The system as claimed in claim 4, wherein the display means are placed in the base station.

6. The system as claimed in claim 4, in which the base station comprises a return path transmitter, the camera comprising means of reception for information communicated via a return path, wherein information relating to the quality of transmission of the images is sent by the return path, and wherein the camera comprises the display means.

7. The system as claimed in claim 6, wherein the display means display a transmission ratio with a first colour when the ratio corresponds to correct transmission and with a second colour when the ratio corresponds to fatal transmission.

8. The video camera system as claimed in claim 1, wherein the quality of transmission is defined by a reception quality ratio (QR).

9. A video camera comprising:
   image acquisition means,
   means of radio transmission for transmitting the acquired images using a constellation modulation,
   image coding means for introducing redundant information in the acquired images for enabling error correction, and
   display means for displaying a quality of transmission of the images, wherein said quality of transmission is determined by measuring a gain required for correct reception of the images, a number of errors corrected by a decoding means, and a modulation error ratio corresponding to an average of discrepancies between symbols received and transmission symbols.

10. The camera as claimed in claim 9, wherein the camera comprises means of reception for receiving an information related to the quality of transmission of the image, from a base station.

11. The camera as claimed In claim 9, wherein the display means display the quality of transmission with a first colour when the quality is correct and with a second colour when the quality is below a desired value.

12. The camera as claimed in claim 9, wherein the display means continuously display the quality of transmission to a cameraman.

13. A base station for at least one video camera comprising:
   means of radio reception for receiving images acquired by said at least one video camera,
   gain means for providing gain to the received images,
   decoding means for decoding the images and for using redundant image information to correct errors, and
   evaluation means for evaluating a quality of reception of the images originating from said at least one camera, wherein the evaluation means measures a gain required for correct reception of the images, a number of errors corrected by the decoding means, and a modulation error ratio corresponding to an average of discrepancies between symbols received and transmission symbols, to determine the quality of image reception.

14. The base station as claimed in claim 13, said at least one video camera comprising image coding means introducing redundant information for error correction.

15. The base station as claimed in claim 13, wherein image transmission is achieved by using a constellation modulation.

16. The base station as claimed in claim 13, wherein the base station comprises display means for displaying the quality of reception.

17. The base station as claimed in claim 13, wherein the base station comprises a return path transmitter for sending commands to the camera, and wherein an information related to the quality of reception is sent to the camera via the return path transmitter.

18. The base station as claimed in claim 13, wherein the display means display a quality of reception with a first colour when the quality is correct and with a second colour when the quality is below a desired value.

* * * * *